July 31, 1951 D. E. WILSON 2,562,517
TIRE CHAIN ATTACHING DEVICE
Filed Feb. 24, 1950 2 Sheets—Sheet 1
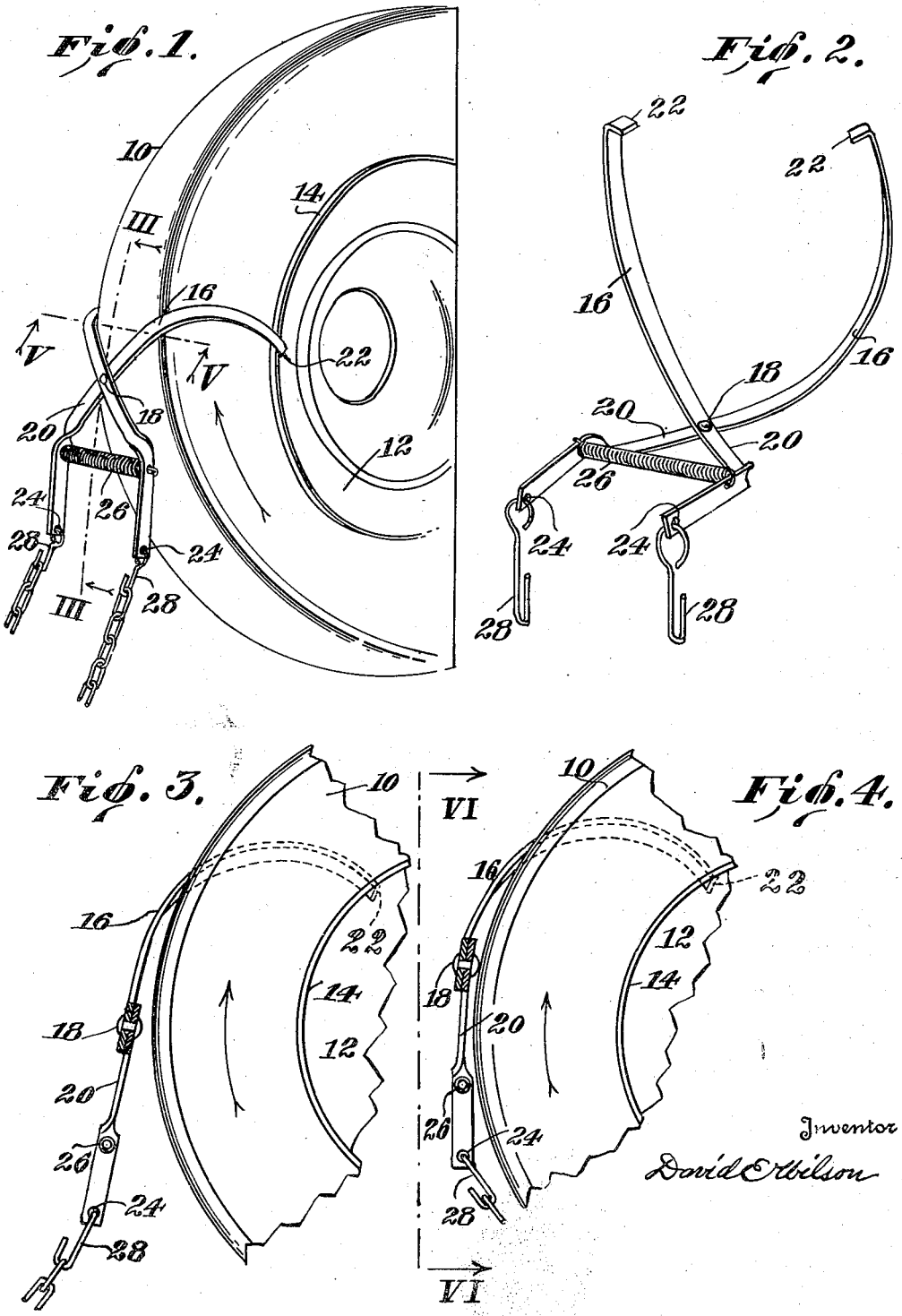

July 31, 1951 D. E. WILSON 2,562,517
TIRE CHAIN ATTACHING DEVICE
Filed Feb. 24, 1950 2 Sheets-Sheet 2
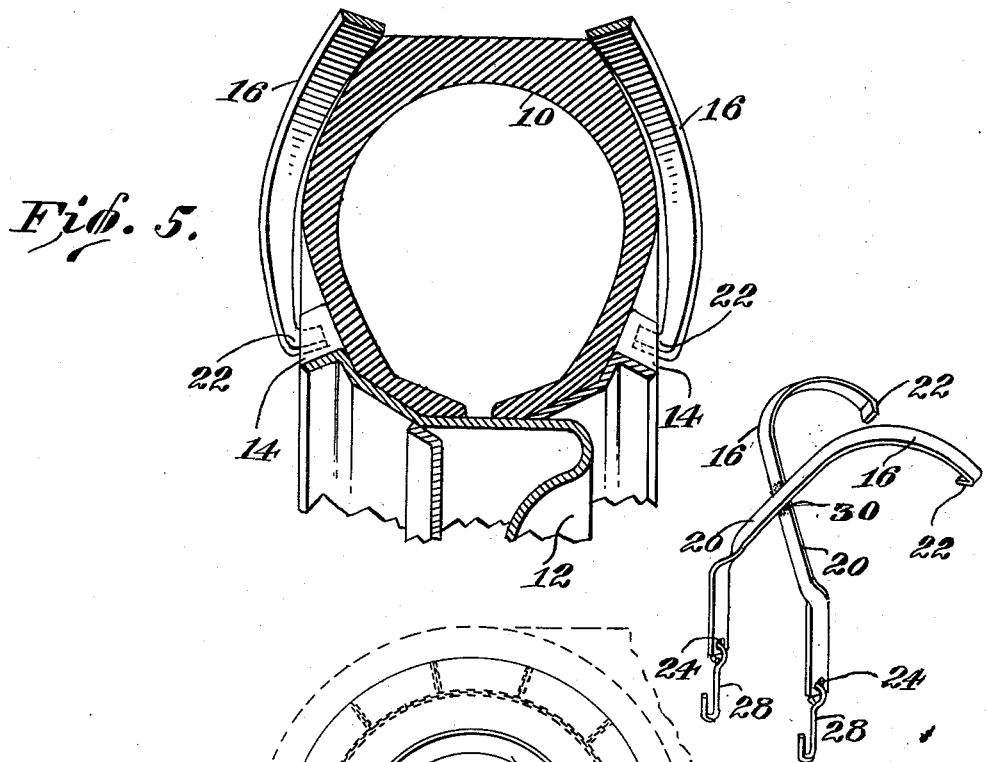
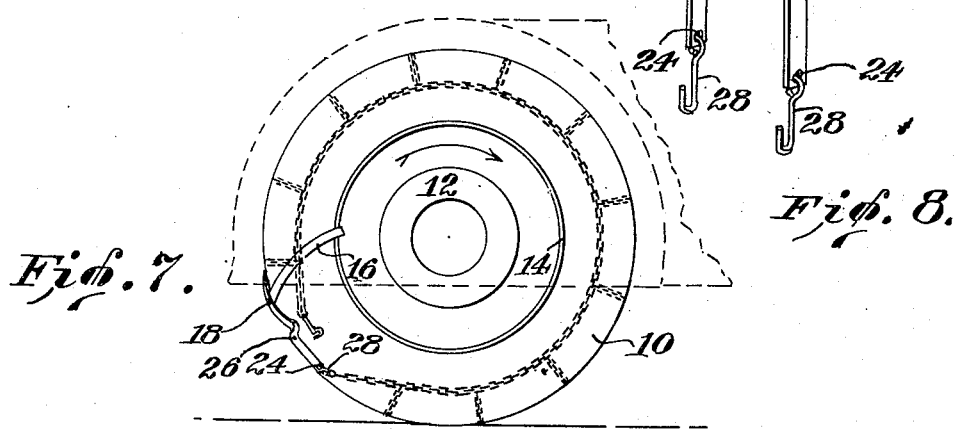
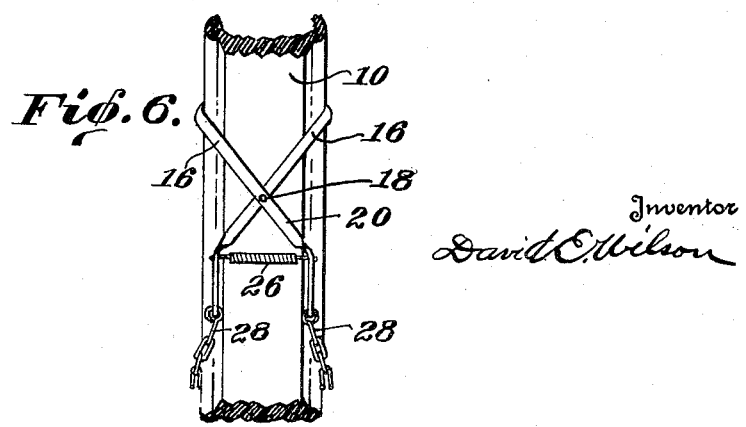
Inventor
David E. Wilson

Patented July 31, 1951

2,562,517

UNITED STATES PATENT OFFICE 2,562,517

TIRE CHAIN ATTACHING DEVICE

David E. Wilson, Arlington, Va.

Application February 24, 1950, Serial No. 146,019

1 Claim. (Cl. 81—15.8)

1

This invention relates to improvement in devices for facilitating the mounting of anti-skid chains to automobile tires.

Attaching anti-skid chains to tires is always a difficult operation and with the modern automobile design which encloses a large portion of the wheel it is an especially arduous and vexatious one. In the past certain devices have been proposed to accomplish this operation but they have depended upon frictional engagement between the devices and the tires. These devices have been unsatisfactory for a number of reasons among which are that some devices become distorted when weight of the automobile vehicle rests on them thereby rendering them ineffective, others mar the sidewalls of the tires. Further, frictional engagement between the devices and the tires is unsatisfactory when applying chains on a muddy or snowy surface as the resistance of the mud and snow may either cause the device to slip along the tire with the result that the chain will not be forced to ride under the wheel or one side of the device or the other will slip with the result that the chain is not applied evenly to the tire.

With these and other difficulties in mind it is an object of my invention to produce a anti-skid chain attaching device which is easy to apply on the wheel of any car and which when applied will positively lock itself to the wheel so the chains will be applied evenly to the tire when the wheel rotates regardless of the surface conditions existing at the time.

Another object of my invention is to provide an anti-skid chain attaching device having means arranged for locking engagement with the metal wheel, the construction being such that the greater the drag from the chain when being drawn under the wheel the tighter the locking engagement between the attaching device on the wheel.

With these and other objects in view the invention will now be described with reference to the accompanying drawings and will be pointed out in the appended claim.

In the drawings:

Fig. 1 is a perspective view of one form of my tire chain attaching device showing its application to a wheel at the beginning of a tire chain applying operation;

Fig. 2 is an inverted perspective view of the tire chain attaching device shown in Fig. 1;

Fig. 3 is a view, partly in section, taken along line III—III in Fig. 1 looking in the direction of the arrows, the view showing the position of the attaching device immediately after being connected to the wheel and before the same is set in motion;

Fig. 4 is a view similar to Fig. 3 showing the position of the tire chain attaching device relative to the wheel after tension has been applied to attaching device by the drag of the chain during the chain applying operation;

Fig. 5 is a sectional view taken along the line V—V in Fig. 1 looking in the direction of the arrows;

Fig. 6 is a view taken along line VI—VI of Fig. 4 looking in the direction of the arrows;

Fig. 7 is a side elevation showing the tire chain attaching device on a wheel at the end of an applying operation, and Fig. 8 is a perspective view of a modified form of my chain attaching device.

Reference is made to the drawings wherein I have shown for purpose of illustration a conventional wheel consisting of a tire 10 to which a skid chain may be applied and a central portion 12 having inner and outer metal flanges 14 (Figs. 1 and 5).

The illustrated chain attaching device, as disclosed in Figs. 1 and 7, consists of two metal wheel engaging members 16 pivoted together by a pin 18, each member 16 having an arm 20 extending beyond the pivot pin. The free end portions of the members 16 are bowed and twisted so as to extend around the sides of the tire and having inturned end portions 22 for engagement with the under side of the metal wheel flange 14 (Fig. 5). The bowed and twisted portions of the members 16 extend at an angle to the arms 20 so that when the chain attaching device is mounted on the wheel with the bowed portions extending in a twisted shape around a tire and the end portions 22 in engagement with the wheel flanges the arms 20 will extend generally along the tread surface of the tire (Fig. 1). By means of the twisted shape of the bowed portions 16, it will be obvious that the under inside edge of said bowed portions when brought into contact with the edges of the tire tread, will be pressed into the tire tread at the point of contact when downward pull is applied and by this action contribute largely to holding the chain attaching device from slipping during the chain mounting operation, the contact of the twisting arms with the tire tread is shown in Figure one and five of the drawings.

The free ends of the arms 20 are provided with chain holes 24 and are bent so that they roughly parallel each other when the chain attaching device is mounted on the wheel. As shown in Fig. 6 the distance between the pivot pin 18 and the bend in the arms 20 is such that the bent portion and parallel portions of the arms do not overlie the tread surface of the tire. With this arrangement the flat portion of the arms 20 will lie flat against the tread when the chain attaching device passes under the wheel and the parallel end portions of the arms 20 will be positioned alongside the sides of the tires which will assist in keeping them in position thus ensuring that pull continues to be applied evenly to each of the side chains of the anti-skid chain assembly.

The chain attaching device is held in position on a wheel when first applied thereto by a tension spring 26 connected to the arms 20, the pull of the spring causing the bowed portion of the members 16 and the end portion 22 to grip the tire and flanges. Anti-skid chains are connected to the chain attaching device by chain hooks 28 mounted in the chain holes 24 formed in the ends of the arms 20. Due to the action of the spring 26 the chain ends need not be attached to the hooks 28 until after the attaching device is applied to the wheel. This is a material convenience with the modern car where such a large portion of the wheel is enclosed by fender and body construction.

In operation my device functions as follows; the arms 20 are pulled away from each other against the pull of the spring 26 thus causing the wheel engaging members to separate until they can be slipped over the tire to the position shown in Fig. 1 when the arms 20 are released permitting the spring 26 to hold the attaching device gripped to the tire with the end portions 22 in metal to metal engagement with the underside of the flanges 14. The chains can be connected to the hooks 28 either before or after the attaching device is applied to the wheel. After the attaching device is applied to the wheel the wheel is caused to rotate and carry with it the attaching device which will pull the chain over the tire. As the drag from the chain increases the pull placed upon the attaching device will cause the wheel engaging members to grip the tire tighter and the end portions 22 to grip more firmly the underside of the metal flanges 14. If desired the end portions 22 can be shaped as shown in Figs. 3 and 4 so as to have an edge or biting engagement with flanges 14. Thus the greater the pull on the attaching device the more positive the engagement of the device with the wheel. This is of particular advantage when the attaching devices and the cross chains pass under the wheel on a icy or muddy surface as the drag on the attaching device is materially increased when the device and cross chains move into contact with the road surface. When the attaching devices reach the position shown in Fig. 7 the device is loosened and disconnected from the wheel and chain after which the chain is fastened on the wheel.

The modification shown in Fig. 8 differs from the attaching device described above in that the members 16 connected to each other by a weld 30. When so connected the resiliency of the metal members 16 will permit them to be pulled apart sufficiently to be slipped over a tire and onto a wheel. This modification has the advantage of eliminating the pin 18 and spring 26 in my other form but is limited in its use to a narrow range of tire sizes.

Having thus described my invention what I claim as novel is the following:

A tire chain attaching device consisting of a self-tightening clamp comprising a pair of metal arms of rectangular cross section, means for pivotally connecting the arms intermediate their ends, the portions of the arms on one side of the connecting means having means for engagement with a tire chain and being bent so as to parallel each other along the side surface of a tire tread, during a mounting operation of a tire chain, the portions of the arms on the other side of the connecting means being bent to conform to the cross sectional curvature of the tire and being laterally twisted so as to contact the tread of the tire with their longitudinal inner edges, and hooks at the free ends of the bent and twisted portions of the arms projecting inwardly toward each other for anchoring engagement of the clamp with the rim flange of a wheel.

DAVID E. WILSON.

REFERENCES CITED

The following references are of record in the file of this patent:

UNITED STATES PATENTS

| Number | Name | Date |
| --- | --- | --- |
| 1,308,153 | Wheat | July 1, 1919 |
| 1,482,382 | Carlson | Feb. 5, 1924 |
| 1,500,409 | Melton et al. | July 8, 1924 |

FOREIGN PATENTS

| Number | Country | Date |
| --- | --- | --- |
| 110,977 | Sweden | June 20, 1944 |